May 13, 1969 W. J. FELMLEE 3,443,592
ROTARY MULTIPORT SAMPLING VALVE
Filed April 6, 1967 Sheet 1 of 2

INVENTOR.
William J. Felmlee
BY
Griswold & Burdick
ATTORNEYS

United States Patent Office 3,443,592
Patented May 13, 1969

3,443,592
ROTARY MULTIPORT SAMPLING VALVE
William J. Felmlee, Bay City, Mich., assignor to The Dow Chemical Company, Midland, Mich., a corporation of Delaware
Filed Apr. 6, 1967, Ser. No. 628,986
Int. Cl. F16k *11/02*
U.S. Cl. 137—625.11                    10 Claims

ABSTRACT OF THE DISCLOSURE

A rotary multiport sampling valve which selects and segregates an inflowing fluid or gas stream from a number of such streams and routes the sampled stream to a sampling port while merging the remaining inflowing streams and directing them out a common purging port.

---

This invention relates generally to a sampling valve and more particularly to a rotary multiport sampling valve.

Many varieties of selector or sampling valves are known or used for analytical purposes. Such valving apparatus is often constructed from conventional one-way valves and ordinary fittings. As such the valves are frequently expensive, relatively inconvenient to employ, and do not adapt themselves readily to multi-stream sampling operations. Rotary valves, as known in the art, usually have not been entirely satisfactory for large sampling operations, wherein it is desired that a single analytical instrument be efficiently connected to a large number of sampling streams. Known rotary valves often require grease or lubricants for sealing or other purposes which can absorb or desorb into the sample stream causing contamination. Further, rotary valves can often wear rapidly at valving surfaces (moving sealing interfaces) causing frequent valve maintenance and expensive interruptions in operations.

It would be advantageous if a rotary sampling valve were available which did not require the use of grease or lubricants and which could efficiently connect a single analytical instrument with a large number of sampling streams, one of which could be routed through or to an instrument (or desired location) while the remainder are directed to a common purging port thereby maintaining continuous flow in all streams.

It would be particularly advantageous if such valve were actuated or operated employing a minimum torque, had means to resist wear at valving surfaces, and provided accurate and positive indexing means.

It would be most advantageous if the internal volume or dead volume of the valving element of such a valve were held at a minimum to better prevent commingling of samples when switching from one sample stream to another.

It would be additionally advantageous if such a valve prevented air leakage into the sample streams when drawing the streams by vacuum pump means, and further if such a valve was operable at high temperatures to eliminate condensation of gas samples having high boiling temperatures.

These and other desired cognate advantages and benefits are achieved in a valve in accordance with the invention which comprises in cooperative combination: a hollow valve body having a first end portion and a second end portion, said valve body defining an interior surface extending inwardly of said second end portion toward said first end portion and terminating generally adjacent thereto, said interior surface comprising a first interior surface portion disposed generally adjacent to and integral with said first end portion, and a second interior surface portion peripherally integral with said first interior surface portion and extending therefrom to said second end portion, said first interior surface portion and said second interior surface portion defining a cavity open to said second end portion and terminating at said first interior surface portion, a generally annular surface extending radially outwardly of said second interior surface portion adjacent said second end portion, a common discharge port communicating between said cavity and the space exterior of said valve body and terminating centrally on said first interior surface portion, a plurality of sample inlet ports communicating between said cavity and the space exterior of said valve body and terminating on said first interior surface portion at locations generally outwardly of and spaced about said common discharge port, and a purging port communicating between said cavity and the space exterior of said valve body and terminating on said interior surface at a location outwardly of said sample inlet ports; a valve operator comprising a plug rotatably supported in said cavity having a first end disposed generally adjacent said first interior surface portion, and a second end axially protruding from said cavity adjacent said second end portion of said valve body, a collar rigidly affixed to and extending radially outwardly from said plug generally adjacent said second end and in spaced adjacent relationship with said annular surface, an actuating means adapted to rotate said plug, a channel defined by said first end of said plug providing selective communication between said common discharge port and a preselected one of said sample inlet ports upon the rotating and the positioning of said plug, a channel sealing means disposed about said channel and affixed to said plug and adapted to mate with said first interior surface portion, a rotary sealing means adapted to sealingly engage said plug and said second interior surface portion at a location generally intermediate of said second end portion and said purging port at its terminating location on said interior surface, an indexing and disengaging means to align said channel with a preselected sample inlet port while simultaneously mating said channel sealing means and said first interior surface portion, and to at least substantially disengage said channel sealing means and said first interior surface portion upon rotation of said plug.

Further features and advantages of the invention will be apparent in the following description and specification, taken in conjunction with the drawings wherein.

Figure 1:
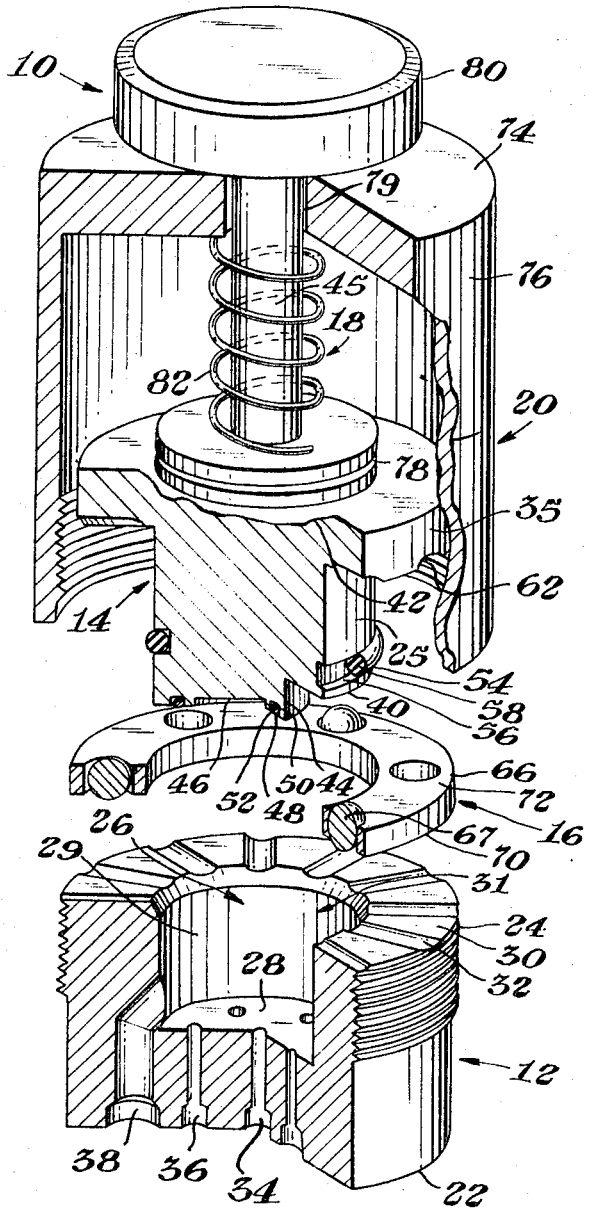
FIGURE 1 is an exploded and cut-away view of a valve in accordance with the invention.

Referring now more particularly to the drawings, there is shown in FIGURES 1 to 4 a desirable embodiment of a sampling valve, indicated generally by reference numeral 10, constructed in accordance with this invention. The valve 10 comprises in cooperative combination a valve body 12, a valve operator 14, an indexing and disengaging assembly or means 16, a bias means 18, and a valve bonnet 20.

The valve body 12 is of a generally hollow cylindrical configuration and includes a first end portion 22 and a second end portion 24. A generally cylindrical interior surface 26 is defined by the valve body 12 and extends inwardly of the second end portion 24 toward the first end portion 22 and terminates generally adjacent thereto. The interior surface 26 includes a generally circular first interior surface or first interior surface potion 28 disposed generally adjacent to and integral with the first end portion 22, and a generally cylindrical second interior surface or second interior surface portion 29 peripherally integral with the first interior surface 28 and extending therefrom to the second end portion 24 A generally cylindrical cavity 31 is defined by the first interior surface 28 and the second interior surface 29. The cavity 31 is open to the second end portion 24 and terminates at the first interior surface 28. Valve body 12 also includes an annular surface 30 extending radially outwardly from the second interior surface 29 adjacent the second end portion 24. Defined on and equally spaced about the annular surface 30 are twelve radially aligned indents 32 (most clearly shown in FIG. 4). Also defined by the valve body 12 and communicating between the space exterior of valve body 12 and cavity 31 are a common discharge port 34 terminating on the central axis of the first interior surface 28, six sample inlet ports 36 terminating on the first interior surface 28 at locations circularly arranged about the common discharge port 34 and radially aligned with a set of alternate indents 32, and a purging port 38 terminating on the interior surface 26 at a location outwardly of sample inlet ports 36.

Valve operator 14 includes a generally cylindrical plug 25 rotatably supported in cavity 31. Plug 25 has a first end or valving end 40 disposed generally adjacent the first interior surface 28, and a second end 42 protruding axially outwardly of the cavity 31 adjacent the second end portion 24. Valve operator 14 also includes a collar 35 extending radially outwardly of plug 25 adjacent the second end 42 and in spaced adjacent relationship with the annular surface 30 of valve body 12, and an actuating means or shaft 45 coaxially disposed on the second end 42 and extending therefrom. The first end 40 of plug 25 has a projecting portion or projection 44 radially disposed thereon and extending therefrom toward the first interior surface 28. The projection 44 defines a channel 46 (most clearly shown in FIGURE 3) providing a selective communcation between the common discharge port 34 and a preselected one of the sample inlet ports 46 upon the rotating and positioning of plug 25. A channel sealing means 48 circumferentially encloses channel 46 and is adapted to mate with the first interior surface 28. The channel sealing means 48 beneficially comprises a circumferentially continuous groove 50 defined on projection 44 about channel 46 and an O-ring 52 seated in groove 50. A rotary sealing means 54 sealingly engages plug 25 and the second interior surface 29. The rotary sealing means 54 beneficially comprises a circumferentially continuous groove 56 defined on plug 25 at a location generally intermediate of the second end portion 24 of valve body 12 and the purging port 38 at its terminating location on the interior surface 26, and an O-ring 58 seated in groove 50. Twelve radially aligned indents 62 are defined by collar 35 opposite to and in spaced adjacent relationship with annular surface 30 and are adapted to cooperate with indents 32 defined thereon. Indents 62 are equally spaced about collar 35 from an initial location radially aligned with channel 46 of plug 25.

Indexing and disengaging assembly or means 16 includes indents 32 and 62, and an annular body or retainer 66 disposed between annular surface 30 and collar 35. Body 66 includes opposed terminal surfaces 70 and 72 which are respectively spaced from and adjacent to the annular surface 30 and the collar 35. The assembly 16 also includes three protuberances or bearings 67 rotatably supported in the body 66 at locations equally spaced from each other, and extending from the respective terminal surfaces 70 and 72 so as to be rotatably engaged with both the annular surface 30 and collar 35 and adapted to mate with the indents 32 and 62 defined thereon.

The valve bonnet 20 comprises an end portion 74 rotatably receiving actuating shaft 45 and a circumferential wall portion 76 integral with end portion 74 and extending therefrom toward and threadably affixed to valve body 12. Secured to actuating shaft 45 outwardly of end portion 74 of bonnet 20 is a handle means 80.

A bias means 18 is freely mounted on actuating shaft 45 within bonnet 20 and is adapted to resiliently urge collar 35 toward annular surface 30. Bias means 18 comprises a thrust bearing 78 mounted on a shaft 45, and a spring 82 mounted on a shaft 45 between and engaged with thrust bearing 78 and end portion 74 of valve bonnet 20.

Figure 2:
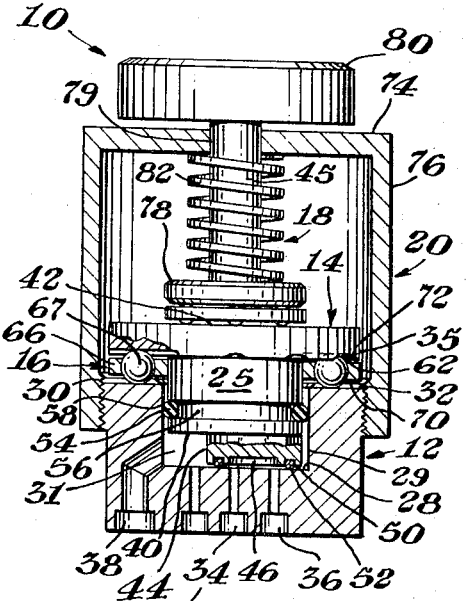
FIGURE 2 is a cut-away view of the valve illustrated in FIGURE 1 as assembled.
Figure 3:
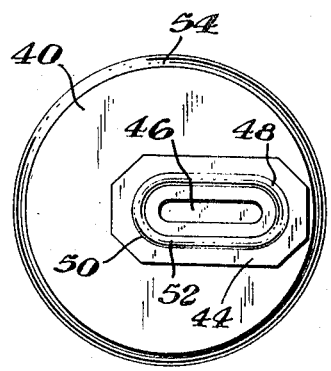
FIGURE 3 is an end view of the valving end of the plug employed in the valve illustrated in FIGURES 1 and 2.
Figure 4:
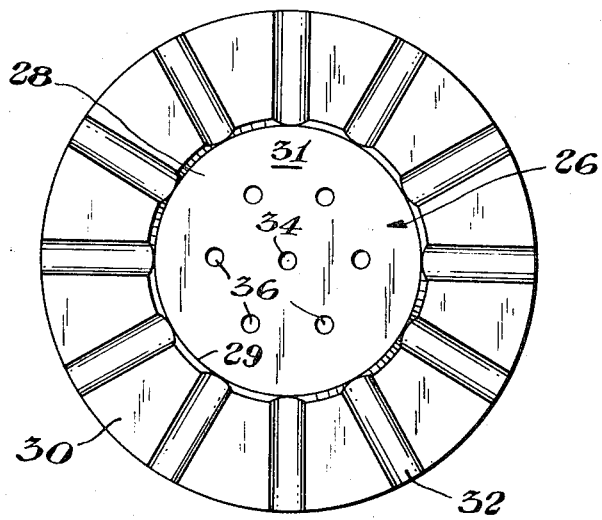
FIGURE 4 is an end view of the valve body employed in the valve illustrated in FIGURES 1 and 2.

In operation, the components of valve 10 are assembled substantially as shown in FIGURE 2. Since channel 46 is radially aligned with an indent 62 and inlet ports 36 are radially aligned with a set of alternate indents 32, plug 25 is initially placed in cavity 31 so that channel 46 is initially radially aligned with a particular inlet port 36. With plug 25 so positioned, indents 32 and 62 will form twelve aligned and faced opposed indent pairs or combinations 32 and 62 with the three protuberances 67 of annular body 66 disposed between and mated with three of the detent pairs 32 and 62. In the initial assembled position, channel sealing means 48, circumferentially enclosing channel 46, is compressed against (by bias means 18) and matingly and sealingly engaged with the first interior surface 28 of valve body 12. Thus, a sample stream (not shown) entering valve 10 through the initial referenced sample inlet port 36 by conduit means (not shown), can be routed through channel 46 and out common discharge port 34 to an analytical instrument or other device. The remaining or unused sample streams similarly entering valve 10, can be simultaneously passed out purging port 38 to maintain continuous flow in all streams and thereby insure the analyzing of fresh or current samples. By rotating the actuating shaft 45 (indexing and disengaging assembly 16 advantageously allows rotation in either direction), channel 46 can be rotated to select and segregate any desired sample inlet port 36. Upon the initial rotating action, protuberances 67 disengage the indents 32 and 62, lifting the valve operator 14 against bias means 18 and consequently disengaging or substantially disengaging the channel sealing means 48 and first interior surface 28. This disengaging action prevents excessive abrasive wear especially on the channel sealing means 48.

Valve 10 will remain in the disengaged position until the adjacent sample inlet port is reached wherein protuberances 67 will again bidirectionally or from opposite sides engage indents 32 and 62, and bias means 18 will slidably urge the valve operator 14 toward annular surface 30 and thereby again engaging the channel sealing means 48 and first interior surface 28.

Projection 44 provides increased clearance between the first interior surface 28 and the first end 40 of plug 25 to reduce flow impedance of the unused sample streams when pumping or venting. If a projection 44 is not desired, however, channel sealing means 48 can still provide a measure of clearance to allow continuous pumping or venting of the unused sample inlet streams, although an undesirable degree of flow impedance may be encountered.

Rotary sealing means 54, in a compressed state with the second interior surface 29, permits valve 10 to operate effectively under vacuum conditions. Thus, a vacuum can be drawn through purging port 38 and common discharge port 34 to draw the sample inlet streams along the respective desired routes without objectional fluid leakage into and contamination of the sample streams by the external atmosphere. The double seal consisting of the rotary sealing means 54 and channel sealing means 48 is especially effective in preventing air leakage into the particular sample streams being routed to an analytical instrument. When operating valve 10 by the drawing of a vacuum through ports 38 and 34, atmospheric pressure acting on valve operator 14 at its surface outwardly of rotary sealing means 54 can serve as a bias means in itself. The effective atmospheric bias means produced thereby (sum of the axial air and gas pressures acting on valve operator 14) can be computed by multiplying the cross-sectional area of cavity 31 (when cylindrical) by the atmospheric pressure less the vacuum or subatmospheric pressure within valve 10. Thus, by increasing the effective atmospheric bias means (i.e. by increasing the cross-sectional area of cavity 31), bias means 18 and valve bonnet 20 can be deleted from the structure of valve 10 without objectionably effecting its capacity to operate under such vacuum conditions.

The rotary sealing means 54, while not required, may be coated with a lubricant, i.e., graphite, to lessen the friction encountered between itself and the second interior surface 29 defining cavity 31 when rotating plug 25. Since the rotary sealing means 54 is completely isolated from the particular stream being sampled (by channel sealing means 48), contamination of the sample stream by the use of such lubricants is unlikely. Friction can also be lessened (as an alternative) by using both a frustoconical plug and cavity. In such an embodiment, upon the actuation of the valve and the lifting of the valve operator, the rotary sealing means will be repositioned relative to a more major diameter of the cavity, and consequently disengaged or substantially disengaged from the second interior surface defining the cavity. Preferably, the airtight or vacuum seal will be maintained by causing only substantial disengagement, the seal means remaining grazingly or lightly engaged with the second interior surface to prevent air leakage into the valve.

Protuberances 67 are advantageously rotatably mounted in annular shaped body 66 to reduce friction between the protuberances and the annular surface 30 and collar 35 when rotating valve operator 14. Thrust bearing 76 has a similar function with respect to spring 78. It will be appreciated, however, that conceivably the valve can still operate as a sampling valve in the absence of a thrust bearing and with the protuberances rigidly mounted in or defined on the body and slidably engaged with the annular surface and the collar, although disadvantageously high torque actuation forces may result.

Valve 10 can be operated at relatively high temperature to prevent condensation of gases during sampling operations. The limiting operating temperature would generally be determined by the material used in the channel sealing means 48 and rotary sealing means 54. If O-ring 52 and 58 are used as shown in the preferred embodiment of FIGURE 1, O-rings formed of a copolymer of vinylidenefluoride and hexafluoropropylene can withstand and will allow operating temperatures up to 500° F. Advantageously, heating elements and a thermocouple means could be affixed to or disposed in the valve body 12 to supply and regulate the desired heating temperature.

Because of the relatively low internal or dead volume of valve 10 (volume of common discharge port 34 and channel 46), the commingling of samples when switching from one sample stream to another is minimized and thus, accurate and representative samples can be obtained with pronounced celerity within a minimum period of time. Preferably for these purposes, channel sealing means 48 is only substantially disengaged from the first interior surface 24 upon actuation or rotation of valve 10, remainder lightly or slidingly engaged therewith during the rotation time lapse to prevent sample leakage into channel 46 during that period.

Figure 5:
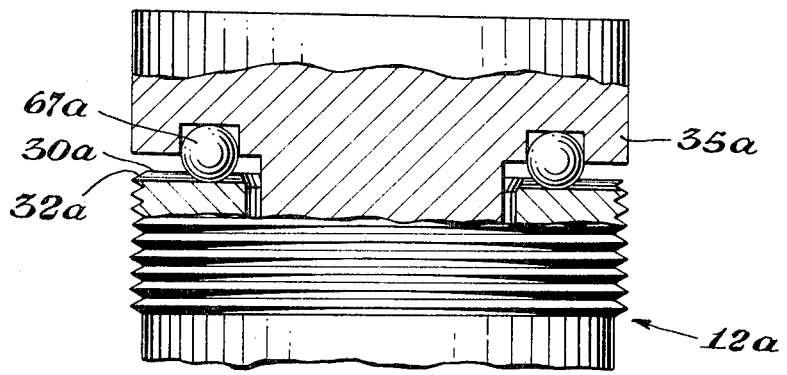
FIGURE 5 is a cut-away view of an alternative embodiment of the indexing and disengaging assembly employed in the valve illustrated in FIGURE 1.

An alternate embodiment of an indexing and disengaging assembly or means is illustrated in FIGURE 5. This embodiment includes a hollow valve body 12a defining an annular surface 30a, and collar 35a disposed opposite to and in spaced adjacent relationship with the annular surface 30a. A plurality of detents or elements 32a are defined about the annular surface 30a and are radially aligned with and corresponding in number to the sample inlet ports (not shown). A plurality of protuberances or elements 67a are mounted, preferably rotatably, in collar 35a and extend toward and are engaged with the annular surface 30a and are adapted to mate with the detents 32a defined thereon. The channel (not shown) can be radially aligned with a protuberance 67a or can be aligned angularly out of phase therewith by a factor of 360° divided by the number of sample inlet ports used.

Advantageously, valves made pursuant to the present invention can be constructed from such conventional materials as steel, brass, synthetic resins, and the like. For instance, a synthetic resin such as polytetrafluoroethylene (available commercially as Teflon®) can advantageously be used to form plug 25. In such an embodiment, if desired, channel sealing means 48 and rotary sealing means 54 can be formed integral with plug 25, due to the relatively excellent sealing characteristics of Teflon® material, thereby eliminating the need for grooves and O-rings as shown in the preferred embodiment of FIGURE 1, or other non-integral similar sealing means 48 and 54.

Thus, valves in accordance with the present invention are advantageously adapted to select and segregate a particular inflowing stream and direct that stream to a common discharge outlet or port while simultaneously gathering and merging the remaining inflowing streams and directing them to a common purging outlet or port thereby maintaining all streams in continuous flow. The valve can be actuated to select particular inflowing streams by a simple rotary action and upon such actuation is advantageously adapted to disengage at its critical valving end to prevent undue abrasive wear. Thus, the valve can be simply operated, resists undue abrasive wear, and provides for selective sampling of a fluid or gas from any of the input streams to determine, for example, the chemical composition, physical properties, state of a reaction, and the like.

Accordingly, what is claimed as new is:

1. A rotary valve comprising in cooperative combination:
    a hollow valve body having
        a first end portion and a second end portion, said valve body defining
        an interior surface extending inwardly of said second end portion toward said first end portion and terminating generally adjacent thereto,
        said interior surface comprising a first interior surface portion disposed generally adjacent to and integral with said first end portion, and
        a second interior surface portion peripherally integral with said first interior surface portion and extending therefrom to said second end portion,
        said first interior surface portion and said second interior surface portion defining a cavity open to said second end portion and terminating at said first intreior surface portion,
        a generally annular surface extending radially outwardly of said second interior surface portion adjacent said second end portion,
        a common discharge port communicating between said cavity and the space exterior of said valve body and terminating centrally on said first interior surface portion,
        a plurality of sample inlet ports communicating between said cavity and the space exterior of said valve body and terminating on said first interior surface portion at locations generally outwardly of and spaced about said common discharge port, and
        a purging port communicating between said cavity and the space exterior of said valve body and terminating on said interior surface at a location outwardly of said sample inlet ports;
    a valve operator comprising
        a plug rotatably supported in said cavity having a first end disposed generally adjacent said first interior surface portion, and a second end axially protruding from said cavity adjacent said second end portion of said valve body,
a collar rigidly affixed to and extending radially outwardly from said plug generally adjacent said second end and in spaced adjacent relationship with said annular surface,
an actuating means adapted to rotate said plug,
a channel defined by said first end of said plug providing selective communication between said common discharge port and a preselected one of said sample inlet ports upon the rotating and the positioning of said plug,
a channel sealing means disposed about said channel and affixed to said plug and adapted to mate with said first interior surface portion,
a rotary sealing means adapted to sealingly engage said plug and said second interior surface portion at a location generally intermediate of said second end portion and said purging port at its terminating location on said interior surface; and
an indexing and disengaging means to align said channel with a preselected sample inlet port while simultaneously mating said channel sealing means and said first interior surface portion, and to at least substantially disengage said channel sealing means and said first interior surface portion upon rotation of said plug.

2. The valve of claim 1 wherein said rotary sealing means is circumferentially disposed on said plug.

3. The valve of claim 1 wherein said first end of said plug includes a projecting portion disposed thereon and extending therefrom toward said first interior surface portion, said channel being defined on said projecting portion of said first end.

4. The valve of claim 1 wherein said actuating means comprises an actuating shaft coaxially disposed on said second end of said plug and extending therefrom.

5. The valve of claim 4 wherein the valve includes:
a valve bonnet having
an end portion defining an aperture, a wall portion circumferentially integral with said end portion, said end portion rotatably receiving said actuating shaft through said aperture,
said wall portion extending from said end portion and affixed to said valve body,
a bias means to resiliently urge said collar toward said annular surface,
a handle means affixed to said actuating shaft outwardly of said end portion of said valve bonnet.

6. The valve of claim 5 wherein the bias means comprises:
a thrust bearing freely mounted on said actuating shaft within said valve bonnet, and
a spring freely mounted on said actuating shaft between and engaged with said thrust bearing and said end portion of said valve bonnet.

7. The valve of claim 1 wherein said indexing and disengaging means comprises:
a plurality of indents defined by said valve body and spaced about said annular surface,
a plurality of indents defined by said collar opposite to and in spaced adjacent relationship with said annular surface and adapted to cooperate with said indents defined thereon,
a body disposed between said annular surface and said collar,
said body defining opposed terminal surfaces respectively spaced from and adjacent to said annular surface and said collar,
at least one protuberance supported by said body and extending from said opposed terminal surfaces so as to be engaged with both said annular surface and said collar and adapted to mate with said indents defined thereon,
said indents being spaced so that when said protuberances are disposed between and mated with said indents, said channel is in a communicating relationship with said common discharge port and a preselected one of said sample inlet ports and said channel sealing means is mated with said first interior surface portion.

8. The valve of claim 7 wherein said protuberances are rotatably supported by said body.

9. The valve of claim 1 wherein said indexing and disengaging means comprises
a plurality of indents defined by said valve body and spaced about said annular surface,
at least one protuberance supported by said collar and extending therefrom so as to be engaged with said annular surface and adapted to mate with said indents defined thereon,
said indents being spaced so that when said protuberances are mated with said indents, said channel is in a communicating relationship with said common discharge port and a preselected one of said sample inlet ports, and said channel sealing means is mated with said first interior surface portion.

10. The valve of claim 9 wherein said protuberances are rotatably supported by said collar.

References Cited

UNITED STATES PATENTS

| | | | |
|---|---|---|---|
| 1,791,923 | 2/1931 | Eule | 137—625.1 X |
| 2,777,515 | 1/1957 | Stirling | 251—162 X |
| 3,056,426 | 10/1962 | Hausel | 137—625.11 |

M. CARY NELSON, *Primary Examiner*,

WILLIAM R. CLINE, *Assistant Examiner*.

U.S. Cl. X.R.

251—162